United States Patent [19]

Frankenberg et al.

[11] Patent Number: 4,920,473

[45] Date of Patent: Apr. 24, 1990

[54] METHOD AND ARRANGEMENT TO COMMUTATE THE CURRENT BETWEEN TURN-OFF VALVE ARMS OF AN I-TYPE STATIC CONVERTER

[75] Inventors: Wolfgang Frankenberg, Erlangen; Hans Laber, Erlangen-Bruck; Alois Weschta, Buckenhof, all of Fed. Rep. of Germany

[73] Assignee: Siemens Aktiengesellschaft, Berlin & Munich, Fed. Rep. of Germany

[21] Appl. No.: 310,728

[22] Filed: Feb. 14, 1989

[30] Foreign Application Priority Data

Feb. 16, 1988 [DE] Fed. Rep. of Germany ....... 3804808

[51] Int. Cl.$^5$ ........................................... H02M 7/521
[52] U.S. Cl. .......................................... 363/96; 363/58
[58] Field of Search .............................. 363/57, 58, 96

[56] References Cited

U.S. PATENT DOCUMENTS

| | | | |
|---|---|---|---|
| 4,597,038 | 6/1986 | Stacey | 363/57 |
| 4,641,231 | 2/1987 | Walker et al. | 363/96 |
| 4,674,023 | 6/1987 | Peppel et al. | 363/57 |
| 4,682,278 | 7/1987 | Marquardt et al. | 363/58 |
| 4,775,925 | 10/1988 | Lezan et al. | 363/58 |

Primary Examiner—Peter S. Wong
Assistant Examiner—Jeffrey Sterrett
Attorney, Agent, or Firm—Kenyon & Kenyon

[57] ABSTRACT

A method and apparatus for commutating a load-independent current between the valve arms of a static converter device. Each valve arm has a valve device with blocking capability in the reverse direction, and a valve damping circuit. The valve device of a current-assuming valve arm is actuated at the time of commutation, and the valve device of the current-delivering valve arm reaches a zero current level upon commutation. In order to prevent a dangerous overvoltage via the inductance of the valve damping circuit, actuation of the valve device in the current-assuming valve arm is delayed until the valve device in the current-delivering valve arm substantially attains a zero current level after being turned off. During this delay, the current can commutate to the valve damping circuit of the current-delivering valve arm and generate a positive voltage there, thus expediently avoiding a reverse current and its dangerous consequences.

11 Claims, 2 Drawing Sheets

METHOD AND ARRANGEMENT TO COMMUTATE THE CURRENT BETWEEN TURN-OFF VALVE ARMS OF AN I-TYPE STATIC CONVERTER

FIELD OF THE INVENTION

The present invention relates to a method and arrangement to commutate a load-independent current between valve arms of a static converter device in which each of the valve arms features a semiconductor-valve device and a valve damping circuit, the valve arms being able not only to block current in the forward direction by its gate signal but also to block a reverse current.

BACKGROUND OF THE INVENTION

In power electronics, arrangements like static converter devices the current comutates between valve arms, and each valve arm is arranged in the device so that current flow should only be possible in the forward direction. In the opposite direction (reverse direction), the valve arm should block current. In a symmetrically blocking GTO, the blocking is inherent. Symmetrical blocking means blocking current independent of the anode-to-cathode voltage, when controlled by a blocking signal. An asymmetrically blocking GTO is capable of blocking a current when there is a positive anode-to-cathode voltage, but possesses no blocking capability when there is reverse voltage polarity. In a transistor or asymmetrically blocking GTO, blocking in the reverse direction is provided by a serially connected diode. To commutate the current, the valve device of the valve arm delivering "current is blocked (disconnected"), and the valve device of the valve arm which assumes delivery of the current (the "current-assuming valve arm") is actuated.

If bridge connections with disconnectable valve arms that are capable of being blocked in the reverse direction are operated in the range of natural commutation, then it is sufficient to actuate the current-assuming valve arm, whereby the current-delivering valve arm receives negative anode-to-cathode voltage and is extinguished. Initially a reverse current forms, which subsequently falls away sharply. However, an overvoltage results, which is dependent on the parasitic inductance of the valve damping circuit and can have values that are so high that the valve becomes endangered.

To avoid this danger to the valves, an especially low-resistance and low-inductance type of valve damping circuit, known in standard thyristor circuits, can be applied. However, this circuit stresses the valve when it is actuated, as a result of a steep current surge.

In FIG. 1, half of a known bridge connection is depicted. A virtually constant, load-independent D/C current is impressed on this bridge connection half via the inductor DR. It contains, for example, three bridge arms, each with a valve device. These valve devices each have transistors T1, T3, T5 with series diodes D1, D3, D5. Through amplification and pulse shaping, control circuits AS1, AS3, AS5 form control voltages for the gate electrodes of the valves from the appropriate control signals s1, s3, s5. An RCD-network is connected in parallel with the transistor-diode series connection. The RCD-network has considerable parasitic inductance, as indicated graphically in FIG. 1. The control circuit and RCD-protective circuit are standard in the industry and are known, for example, from Appendix 2 to the "Thyristor Applications Notes" AN-315 (U.S.A., 1982) of the firm "International Rectifier."

As long as the valve T1 carries a current, with valves T3 and T5 blocked, the voltage of the direct current connection P is coupled to the three-phase a.c. current connection R of the bridge connection up to the output voltage of the valve arm. If now, for the polarity of the three-phase a.c. current connections as drawn in FIG. 1, appropriate control signals s1 and s3 are used to simultaneously actuate the valve arm T3 and block the valve arm T1, then valve T3 receives (or assumes) the current. However, a reverse current forms on valve T1 and a polarity reversal of the voltage occurs in the valve damping circuit RCD. If this reverse current breaks away, then the leakage inductance produces a high peak in the now negative anode-to-cathode voltage of valve T1, which thereby becomes endangered.

A method and arrangement are needed to commutate a load-independent current in a static converter while avoiding this endangerment of the valve devices in the converter.

SUMMARY OF THE INVENTION

This need is met by the present invention, which provides a method to commutate a load-independent current between arms of a static converter device in which each valve arm has a turn off ("disconnectable") valve arm has device with blocking capability in the reverse direction and a valve damping circuit. The valve device of a current-assuming valve arm is actuated at the time of commutation, while the valve device of a current-delivering valve arm reaches a zero current level upon commutation. Specifically the valve device in the current-delivering valve arm is disconnected, and the actuation of the valve device in the current-assuming valve arm is delayed until the valve device in the current-delivering valve arm substantially attains a zero current level after being disconnected.

The invention is based on the realization that the reverse current and its associated dangerous backlash voltage in the current-delivering valve arm only occur, when the current-delivering valve arm switches over to the blocking state during a negative valve voltage. This negative valve voltage always occurs in the current-delivering valve arm when the current-assuming valve arm has first been blocked, during a positive anode voltage in the current-assuming valve arm, and is then switched on to accept the current while the current-delivering valve arm is still conducting. The reverse current does not occur, however, when the current-delivering valve arm is disconnected by its control voltage, while the anode voltage on this valve arm is positive. If the current-assuming valve arm is subsequently triggered only after the current has been clearly reduced by the current-delivering valve arm, then a negative anode voltage occurring on the now blocked current-delivering valve arm can no longer cause any significant endangerment.

Accordingly, the actuation of the valve in the current-assuming valve arm is delayed until the valve in the current-delivering valve arm substantially attains a zero current level, by disconnecting the valve of the current-delivering valve arm. During this delay time, therefore, both valves are blocked. The current can thereby commutate to the valve damping circuit in the current-delivering valve arm and produce the desired positive anode voltage on the disconnected valve.

The end of the delay time is determined by the fact that a current path must be opened, through the currents assuming valve arm, for the D/C current supplied from the D/C current circuit, such that no overvoltages can occur in the valve devices. With this limitation, a time interval is observed between the disconnecting of the current-delivering valve arm and the actuating of the current-assuming valve arm. In conventional static converters with load-independent D/C current, this time interval is considered unacceptable, but in the present invention, the interval can last for a considerable amount of time. The time interval is guaranteed by, for example, current monitoring, voltage monitoring or time monitoring.

Such time intervals are customary and often necessary in bridge connections which function with a load-independent direct voltage. The time intervals prevent direct voltage, which is drawn from an intermediate circuit capacitor for example, from discharging in a short circuit-like manner when one valve arm is actuated and the other valve arm has not yet attained its blocking capability. An overvoltage which could be caused by a current flowing in the inductance on the A.C. voltage side after the interruption, is avoided due to the recovery diodes. The goal in such circuits is to keep the required switching time interval as short as possible (compare U.S. Pat. No. 4,597,038), contrary to the present invention.

DETAILED DESCRIPTION

Figure 1:
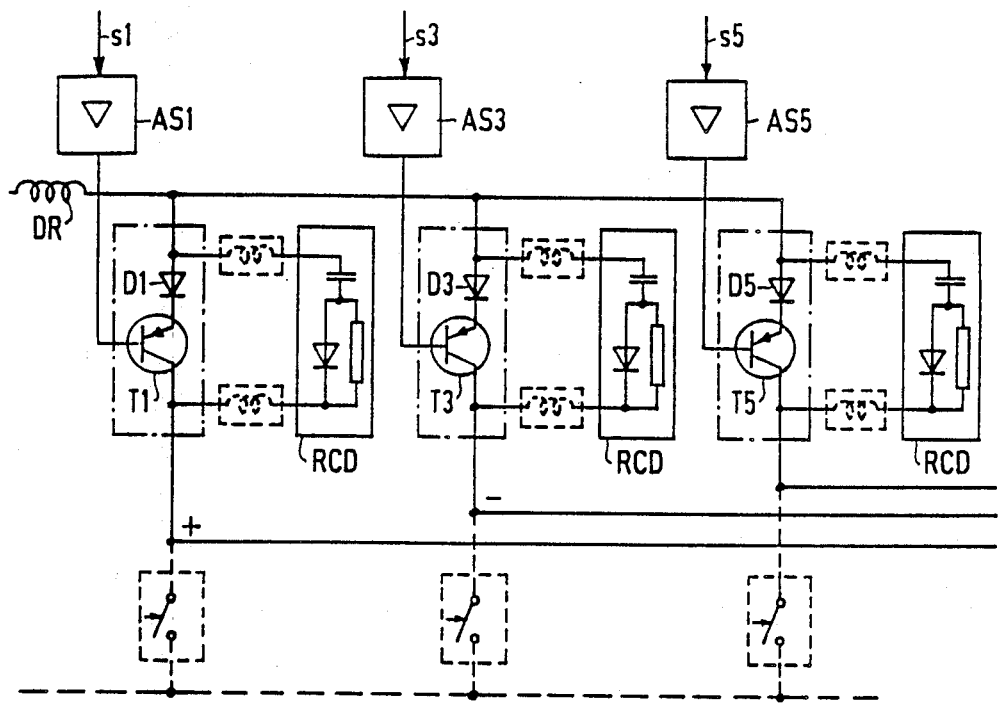
FIG. 1 illustrates a prior art device.
Figure 2:
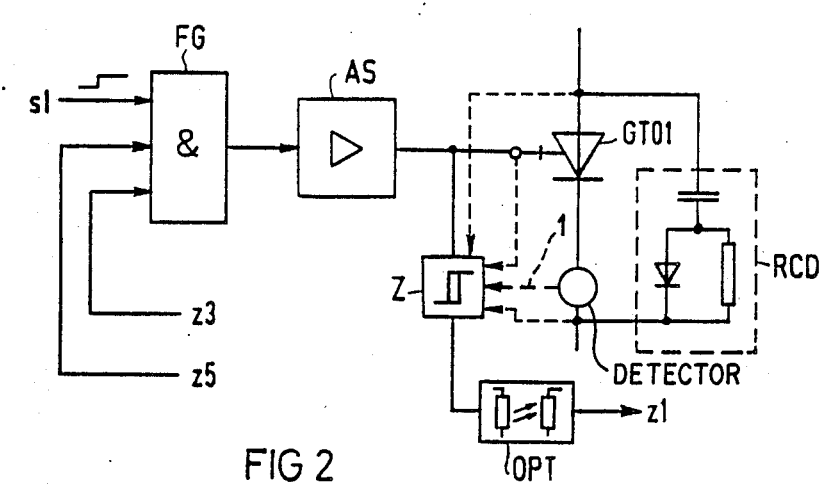
FIG. 2 illustrates a circuit constructed according to an embodiment of the present invention for controlling the valve arms of a static converter.

FIG. 2 illustrates a device according to the present invention which controls the valve arms of a static converter. As symmetrically blocking GTO is shown as an example with valve damping circuit RCD and a control circuit AS. A status acquisition device Z detects a zero current condition of the valve GTO1 when it is disconnected and generates a corresponding status signal z1. An unblocking device FG is coupled in series via the control circuit AS to the input of the valve GTO1. This unblocking device FG will only release a switching signal to actuate the valve GTO1 when the status acquisition device Z of a valve that is to be disconnected emits the status signal z1. The status signal z1 indicates that the zero current status has been detected in the disconnected Valve.

In the simplest case, as indicated by the interrupted signal line 1 in FIG. 2, the status acquisition device Z of the valve GTO1 is coupled to the valve circuit connections. For example, the status acquisition device Z can be coupled to a current detector arranged in the supply lines of the valve. The unblocking signal for other valve arms is generated by the disconnected valve then, only when the detected current in the disconnected valve falls below a threshold value. In the illustrated embodiment, a separate current detector will be connected to each valve arm of the static converter device. However, the voltage in the valve device of the current-delivering valve arm could also be detected by an appropriate voltage detector, which would delay switching on the valve arm to be actuated, through the unblocking device FG, until the detected voltage exceeds a threshold value. This threshold value must be adjusted to the maximum applied blocking voltage in the blocking state of the valve, and should therefore be selected to be at a relatively high level. Therefore, it is only possible to keep a relatively small safety clearance, when compared to the interference voltage to be suppressed, In FIG. 2, the status acquisition device Z is coupled to a gate electrode of GTO1, to detect its control voltage. The status acquisition device Z generates the unblocking signal 1, only when the detected control voltage reaches a preselected threshold value.

A control-to-load isolation between the status acquisition device Z of one valve arm and the unblocking device FG of other valve arms may be required. This isolation is provided for, example, optically with optical couplers OPT (FIG. 2) or fiber optic waveguides with photodiodes, or magnetically.

The unblocking device FG blocks the actuation signal s1 for GTO1, until the corresponding status signals z3, z5 of the other valves of the same half-bridge report the zero current status of these valves. These other valves of the half-bridge are those valves of the static converter device which are capable of and intended for delivering the current zs to be accepted by the valve GTO1. This is accomplished by a logic circuit, which, in the simplest case, is an AND gate. In the following description, the "on"-state of the control signal s1 and the enabled status of the signals z3 and z5 are each indicated by "1".

Figure 3:
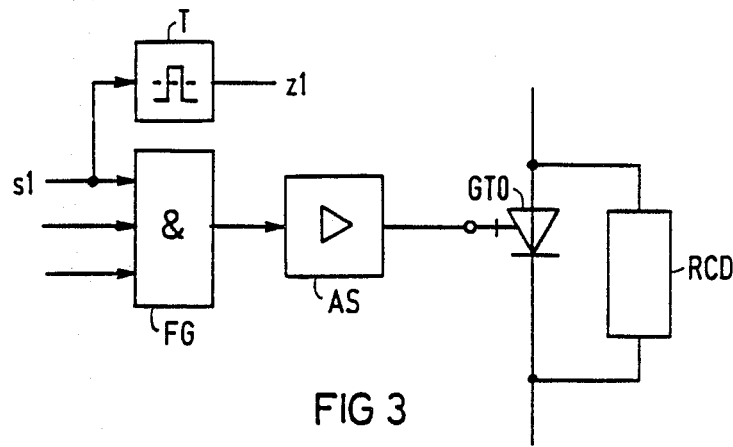
FIG. 3 shows another embodiment according to the invention of a circuit for controlling the valve arms of a static converter.

In FIG. 3 the status acquisition device is configured as a timer module and is coupled to the control circuit, in this case the unblocking circuit FG. If the GTO is disconnected by the appropriate disconnect signal "0", then actuation of the timer module T is triggered, which produces the enabling status signal z1=1 only after a predetermined time delay. This feature has the advantage that no control-to-load isolation is necessary. On the other hand, providing a time delay which is optimum causes difficulties. The optimum time delay depends on several operating parameters, such as, for example, temperature, current, storage time of the GTOs, and propagation delays in signal processing. Therefore, the storage time of the time-delay element T can be modified depending on the operating parameters of the static converter device.

Figure 4:
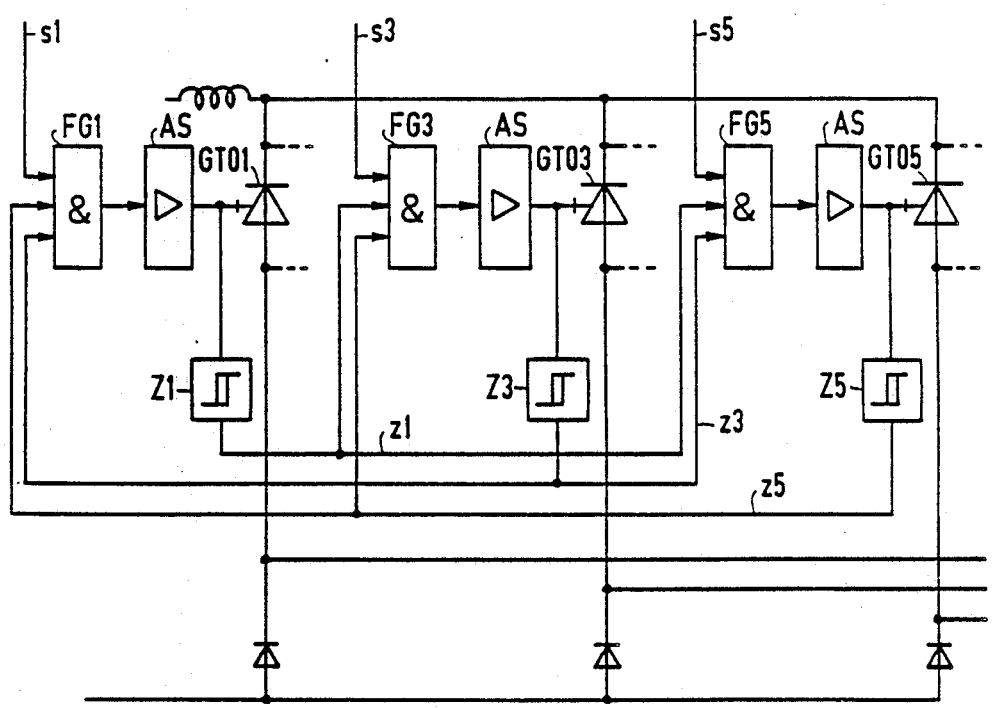
FIG. 4 illustrates an embodiment of the present invention constructed as a half-controlled bridge.

The invention is also applicable to completely different static converter devices, for example, bridges with different phase or pulse numbers, bridges connected in parallel, or half-controlled bridges. This is illustrated in FIG. 4, using as an example a half-controlled bridge. The controlled commutation of the current takes place, thereby, only in one bridge-half, so that only the valve devices of this controlled bridge-half need to be equipped with unblocking devices FG 1, FG 3, FG 5 and with corresponding status acquisition devices Z1, Z3, Z5. The status signal for the zero current status of a valve is applied to each of the inputs of the unblocking devices of the other valve devices of the bridge-half. The valve damping circuit is not illustrated in FIG. 4 for sake of clarity. Instead of the symmetrically blocking gate turn-off thyristors GT01, GT03, GT05, other semiconductor valves can be used.

A static converter device constructed according to the present invention can be used with an electricity supply system or a machine.

What is claimed is:

1. A method to commutate a load-independent current between valve arms of a static converter device, each valve arm having a turn off-valve device with blocking capability in the reverse direction and a valve damping circuit, with the valve device of a current-assuming valve arm being actuated at the time of commutation, and the valve device of a current-delivering valve arm reaching a zero current level upon commutation, the method comprising the steps of:

turning off the valve device in the current-delivering valve arm; and delaying actuation of the valve device in the current-assuming valve arm until the valve device in the current-delivering valve arm substantially attains a zero current level after being, turned off.

2. The method of claim 1, further comprising the steps of detecting the current level in the current-delivering arm; and comparing the detected current level to a threshold value; wherein the actuation of the valve device in the current-assuming arm is delayed until the detected current level falls below a threshold value.

3. The method of claim 1, wherein the step of turning off the current-delivering valve arm includes generating a turning off control signal; and further comprising the steps of triggering a time-delay element with the control signal; and enabling the actuation of the current-assuming valve arm after a preselected time delay following the triggering of the time-delay element.

4. The method of claim 3, wherein the preselected time delay of the time-delay element is dependent on operating parameters of the static converter device.

5. A method to commutate a load-independent current between valve arms of a static converter device, each arm having a turn-off valve device with blocking capability in the reverse direction and a valve damping circuit, with the valve device of a current-assuming valve arm being actuated at the time of commutation, and the valve device of a current-delivering valve arm reaching a zero current level upon commutation, the method comprising the steps of:

turning off the valve device in the current-delivering valve arm; and detecting the voltage on the valve device of the current-delivering valve arm; and delaying actuation of the valve device in the current-assuming valve arm until the detected voltage exceeds a threshold value.

6. A method to commutate a load-independent current between valve arms of a static converter device, each arm having a turn-off valve device with blocking capability in the reverse direction and a valve damping circuit, with the valve device of a current-assuming valve arm being actuated at the time of commutation, and the valve device of a current-delivering valve arm reaching a zero current level upon commutation, the method comprising the steps of:

turning off the valve device in the current-delivering valve arm; and detecting the voltage at a control input of the valve device of the current-delivering valve arm and delaying actuation of the valve device in the current-assuming valve arm until the detected voltage exceeds a preselected threshold value.

7. A static converter device for a load-independent current, comprising:

a plurality of valve arms, wherein each valve arm includes:

a valve device with current blocking ability in a reverse direction and having a control input;

a valve damping circuit coupled to said valve device;

a control circuit coupled to said valve device which generates a turn off signal to turn off the valve device and an actuation signal to switch on the valve device;

a status acquisition device coupled to the valve device which detects a zero current level of the valve device and generates a status signal indicating the zero current level of the valve device;

an unblocking device coupled to the control circuit which enables the control circuit to supply the actuation signal to the valve device in the valve arm in response to the generation of the status signal in another of said valve after the another valve arm has been turned off.

8. The static converter device of claim 7, further comprising a current detector coupled to each valve device, and wherein said status acquisition device has an input, with said input being coupled to the current detector.

9. The static converter device of claim 7, further comprising a voltage detector coupled to each valve device to detect a voltage drop on the valve device, wherein said status acquisition device has an input, with said input being coupled to the voltage detector.

10. The static converter device of claim 7, wherein each valve device has a control input and the status acquisition device has an input, with said status acquisition device input being coupled to the control input of the valve device.

11. The static converter device of claim 7, further comprising an electrical isolator coupled between the status acquisition device of one valve device and the unblocking devices of the other valve devices of the static converter device.

* * * * *